Aug. 3, 1965 W. F. DAHL 3,198,874
SEMI-CONDUCTOR HOUSINGS AND METHOD OF MAKING THE SAME
Filed Jan. 23, 1961 2 Sheets-Sheet 1
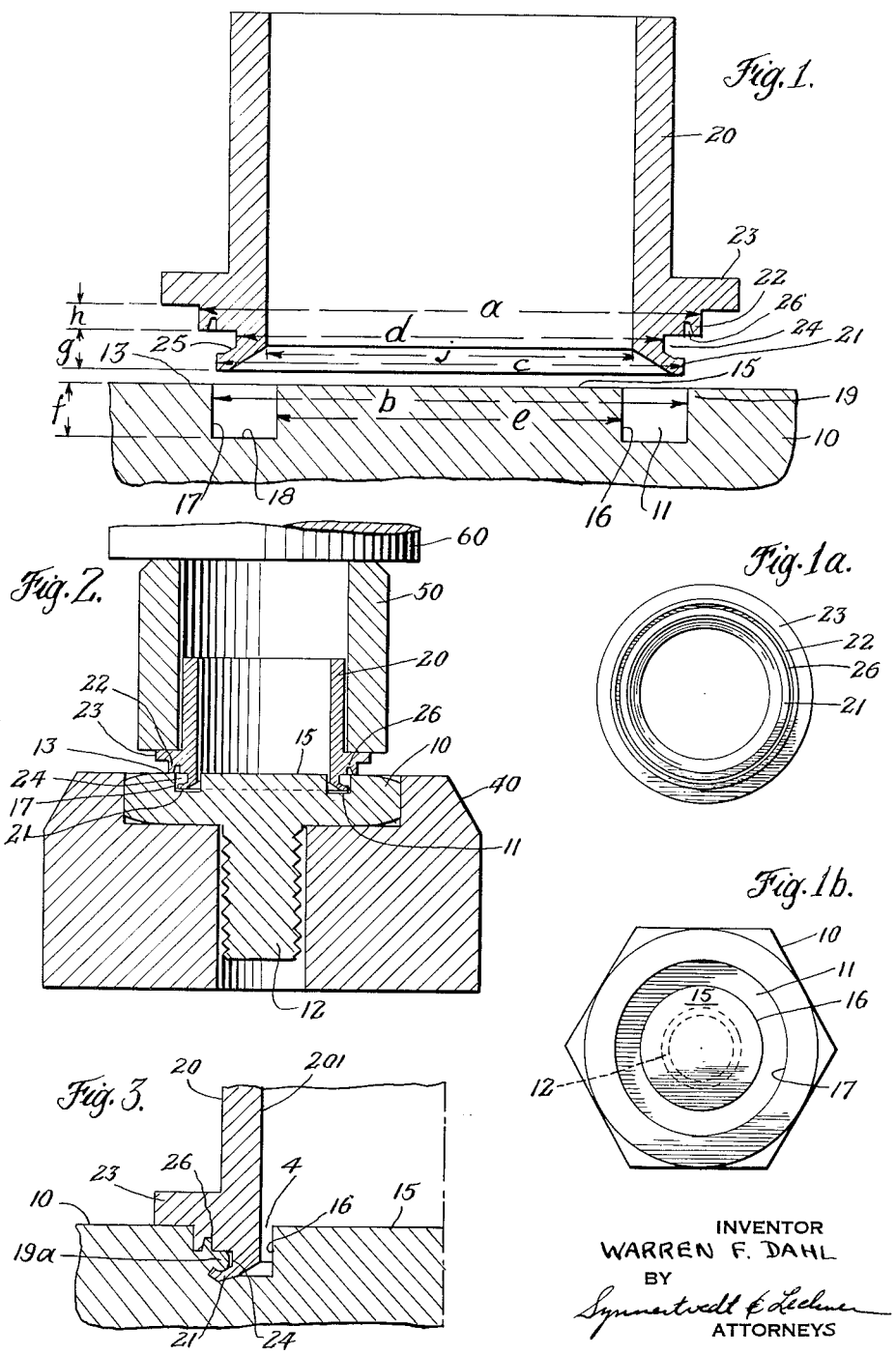
INVENTOR
WARREN F. DAHL
BY
ATTORNEYS

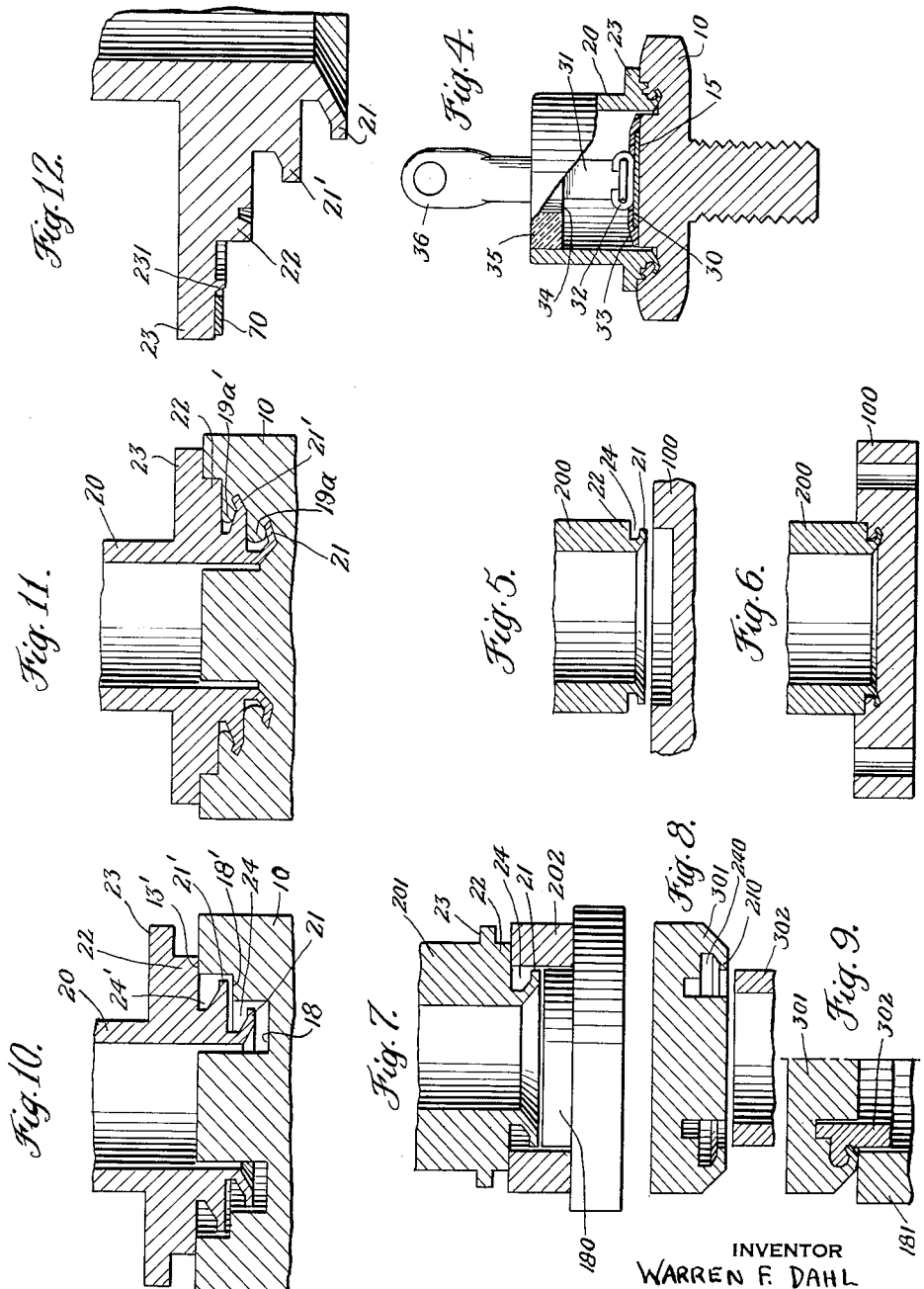

United States Patent Office 3,198,874
Patented Aug. 3, 1965

3,198,874
SEMI-CONDUCTOR HOUSINGS AND METHOD
OF MAKING THE SAME
Warren F. Dahl, Philadelphia, Pa., assignor to Standard
Pressed Steel Co., Jenkintown, Pa., a corporation of
Pennsylvania
Filed Jan. 23, 1961, Ser. No. 84,439
13 Claims. (Cl. 174—52)

This invention relates generally to the sealing or interlocking of two parts, and is directed to both the method of forming the seal and to the seal itself. The invention has particular applicability in the forming of strong seals where at least one of the parts is a tube or includes a tubular section at the desired point of sealing. Still more particularly, the invention is concerned with the forming of a strong hermetic seal primarily by mechanically interlocking the parts and without the use of sealing aids such as sealants, adhesives, heat or chemical action.

The seals formed in accordance with this invention can be effectively utilized in a great many different situations. However, they are especially useful in the forming of housings for solid state devices such as rectifiers, transistors, and the like, and they can also be used in connection with other mechanical, electrical or electronic devices which are desirably housed in an assembly which can withstand internal and external fluid pressures, and where it is desired to employ a seal which will not be impaired by temperature variation cycles, vibration, shock or by compressional, tensional, torsional or shearing forces.

The assembling of a stud mounted silicon rectifier will be used herein for purposes of illustrating how seals can be made in accordance with this invention and also will serve to illustrate certain of the objective and advantages of such seals.

In making semiconductors, it is necessary to form a hermetically sealed assembly. Those assemblies which are stud mounted have presented particularly difficult problems in attaching the copper stud bases to the steel glass sealed caps. Heretofore this joining has been effected by soldering, brazing, welding or a combination of these methods.

One of the major problems encountered in the making of such heat sealed assemblies is the contamination of the semiconductor wafer. In forming heat seals, gaseous impurities are released from the solder or brazing materials in the joint or from lacquers and latex used to coat the wafer, and these impurities carry over and contaminate the wafer so that its properties are impaired. Further where projection welding techniques are employed there is the ever present danger of contamination of the dice or wafer by "spit out" or splatter. Further another important difficulty encountered in making the heat sealed housings arises by virtue of the fact that the heat will soften the metal in the thread area and weaken the threads.

Still another source of difficulty encountered in the forming of heat sealed semi-conductor housings involves the matter of distortion of the base due to the heating. If the stud face on which the wafer is secured is distorted by as little as 0.001", the frequency of electrical failures increases significantly; buckling or distortion of this order can occur in the making of heat seals even when steps are taken to cool the base during the sealing operation.

These difficulties primarily arise because of the heating of the metal parts in order to effect the seal and they significantly decrease the production efficiency and impair the quality of the finished product. In addition, heat sealing techniques involve extensive fixturing and time consuming operations in order to produce a good seal.

The foregoing difficulties are overcome by the heatless seals formed in accordance with the present invention, some typical embodiments of which are illustrated in the following drawings; the invention, however, is not to be construed as limited to the particular structures shown therein.

In the drawings, FIGURE 1 is a cross section of a cap member and a base member which shows a typical sealing configuration before effecting the interlock;

FIGURE 1a is a plan view, from the bottom of the cap of FIGURE 1, showing the positioning of some of the main elements of the cap;

FIGURE 1b is a plan view from the top of the base member of FIGURE 1;

FIGURE 2 is a cross section showing the cap and base of FIGURE 1 positioned in the press prior to the application of pressure to seal the cap in the base;

FIGURE 3 is a cross section showing the cap and base of FIGURE 2 after the parts have been interlocked;

FIGURE 4 is a side elevation of an assembled stud mounted, glass sealed, silicon rectifier—the housing has been partly broken away and the case sectionalized to illustrate the positioning of the parts;

FIGURES 5 and 6 are cross sectional side elevations of an alternative form of a sealing configuration;

FIGURE 7 is a cross sectional side elevation of another alternative form of a sealing configuration, which is especially useful in joining two tube like parts;

FIGURES 8 and 9 illustrate an alternative sealing configuration both before and after effecting the interlock;

FIGURES 10 and 11 illustrate still another type of sealing configuration of this invention; and FIGURE 12 shows one way in which a gasket may, be positioned and used in connection with seals made according to this invention—in those instances where it is desired to employ gaskets.

In the various figures where parts are identified by the same number, functional identity of the parts is indicated. In some instances, however, parts functioning in the same manner will be identified by different numbers.

Referring now to the illustrative embodiment of the invention as shown in FIGURES 1 to 3, the assembly comprises two parts—a base member 10, and a cap member 20. The base member 10 is provided with an annular groove 11 which is adapted to receive an end portion of cap 20. In most assemblies made in accordance with the invention the base and cap preferably have somewhat different plasticity characteristics, e.g. a steel cap and a copper base. However, by proper dimensioning and by suitable control of the mating pressure, it is possible to form satisfactory seals from two parts formed of the same material or from materials have very similar plasticity characteristics.

As shown in FIGURES 1 and 1a, the cap 20 is a tubular part having a circular cross section; however, other cross sectional configurations can be employed if it is necessary or desirable to do so. The end of the tube which is to be interlocked with the base part is provided with a series of circumferential flanges 21, 22 and 23. The leading or outermost flange 21 has been designated the stress ring and its functions will be described in greater detail hereinafter. Flange 22 is known as the compression ring and flange 23 is known as the control ring. The stress ring and the compression ring are integral with the tube wall. In the wall portion of the tube intermediate the stress ring and the compression ring there is formed an annular outwardly opening recess 24. The leading edge of the compression ring and the trailing edge of the stress ring serve as walls of the recess 24. As can best be seen in FIGURE 1, the root diameter of the recess ("d") is less than diameter ("c") of the stress ring 21 or the diameter ("a") of the compression ring 22.

In forming of the interlock it is intended that the stress ring bend so as to constrict the opening leading to the recess 24; therefore to facilitate the bending of the stress ring, it is preferred that the stress ring be given a configuration that projects downwardly and outwardly from the wall of the cap, and it is also desirable to provide the stress ring with a web portion 25 which is somewhat thinner than the wall thickness of the tube and approximating or less than the thickness of the circumferential edge of the stress ring itself.

The control ring 23, when employed, is also an integral element of the cap. The control ring provides a convenient point for the uniform application of axial pressure, it serves to limit the extent to which the cap can be installed or seated in the base member, and it also provides an effective but simple basis of visual inspection to determine if the cap has been properly installed. Where the cap member, as shown in FIGURE 4, includes a glass sealed lead conduit, the control ring becomes an important feature of the assembly as it serves to prevent straining the glass seal. However, in many applications as can be seen for example in FIGURES 5 and 6 the control ring can be dispensed with. Where control flanges are employed they should closely follow a compression ring and should have a diameter which is appreciably greater than that of the compression ring it follows.

The base member 10, as shown in FIGURES 2 and 1b, is a threaded stud 12 having a hexagonal head. An annular groove 11 is formed in the top face of the stud head. This groove is adapted to concentrically receive the end of the cap having the stress ring. The inner diameter of the groove (e) is less than the inner tube diameter (j) in the portion thereof which subsequently will be positioned within the groove 11; this configuration will provide a gap (see 4 in FIGURE 3) between the cap wall and the inner base groove wall 16 which forms the plateau 15.

The outer base groove diameter (b) approximates but is slightly larger than the maximum diameter (c) of the stress ring to permit the cap to slip into the groove 11. The outer base groove diameter (b) is appreciably less than the outer diameter (a) of the compression ring 22 so that the leading edge of the compression ring can overlap and engage the face of the base in the portion 13 immediately outward of the outer groove wall 17. This dimensioning can be readily seen in FIGURE 2.

In the assembly shown in FIGURE 1 the bottom 18 of the base groove 11 functions as a bottoming stop. The depthwise positioning of the bottom 18 must be interrelated to the axial spacing of the stress ring, the compression ring and the control ring. As shown in FIGURE 1 the depth (f) of groove 11 is greater than the axial distance (g) from the leading edge of the stress ring to the leading edge of the compression ring, but the depth (f) is less than the combined axial distance (g+h) from the leading edge of the stress ring to the leading edge of the control flange.

In the FIGURE 1 embodiment, the leading edge of the compression flange 22 is provided with a secondary recess 26. Together the recesses 24 and 26 provide a labyrinth or branched recess in which flowed material from the base member will be gripped at a plurality of angularly disposed points. To assist in flowing material from the base with the secondary recess it is desirable to position the secondary recess so that its opening overlaps the outer edge of base groove 11 when the parts are positioned as in FIGURE 2.

The grooves, recesses, flanges, rings and the like can be formed on the cap and base in any conventional manner, but generally they are machined or cast if the configuration is susceptible to such operations.

The assembly of components of the FIGURE 1 embodiment can be seen in FIGURE 2. The base member 10 is placed in a confining die 40, which provides a fixed support to under portions of stud while permitting access to the grooved face. However, if the base material is sufficiently hard, the die need not be a confining die. The cap 20 is then positioned squarely on the base 10 with stress ring 21 inserted and coaxially received by the base groove 11. A punch member 50, which is adapted to slip over the cap and engage the trailing edge of the control flange 23, is then positioned as shown. Pressure, in a direction generally perpendicular to the plane of the leading edge of the compression ring, i.e., in line with the cap axis, is then applied by suitable pressing means, such as conventional mechanical or hydraulic presses.

The actual pressure to be applied by the press to effect the seal will depend on various factors especially the sealing configuration (i.e., the dimensioning and the relative positioning of the grooves, flanges, recesses, etc.) and the physical properties of the base and cap materials. The relative plasticity of the two parts is in most instances the most important property to be considered although the hardness, elasticity, and similar properties related to the deformability and flowability of the material under pressure should be considered. The pressure applied in the sealing of any given configuration should be sufficient to initiate plastic flow of one of the materials at points which are subjected to pressure. In instances where rather delicate or fragile instrumentalities such as solid state devices or the like are affixed to one of the seal forming members at the time the seal is formed, the pressure employed should not be so great that it will set up forces that are capable of distorting or deforming that portion of the assembly to which the instrumentality is affixed.

When axial pressure is applied to the control or indicator flange 23 in the FIGURE 1–2 embodiment, the compression ring 22 will be seated in the wall portion of the base where the outer periphery of the groove meets the face of the base; the material in this zone is designated 19 in FIGURE 1. The material which is displaced in the seating of the cap is caused to flow plastically into the primary recess 24 and the secondary recess 26 branching off therefrom. The cold flowed material is shown in FIGURE 3 as 19a.

In accordance with the invention and as shown in the FIGURE 1 to 3 embodiment before the seating of the cap in the base is complete the leading edge of the stress ring 21 will engage or "bottom" on the bottom wall 18 of the base groove 11. Upon bottoming, the stress ring deflects or bends. The deflection of the stress ring, as can be seen in FIGURE 3, causes the opening leading to the annular recess 24 to be constricted so that the cold flowed material in the recess is gripped by the upwardly bent stress ring 21. The bottoming of the stress ring also causes the outer edge thereof to expand radially and thereby causes portions of the stress ring to become partially embedded in the outer wall of the base groove and also in the bottom of the groove itself. When the control ring 23 engages the face 13 of the base as in FIGURE 3, the cap is deemed to be fully seated. The deflection and radial expansion of the stress ring, provided such expansion results in the partial embedment of portions of the stress ring in wall portions of the groove, will serve to induce and maintain the assembly in a state of elastic stress.

The residual "spring back" or elastic stress which is thereby set up is highly important in the formation of good hermetic seals, especially where the cap and base have different thermal expansion coefficients and where the instrumentality is to be subjected to extreme vairations in temperature. The spring back causes the seal to be maintained by permitting the cap to follow the expansion of the base without breaking the seal. For example, where the base is copper and the cap is steel, the depth of the base groove will, on heating, expand at a more rapid rate than the steel cap will elongate; the residual spring back, however, maintains the stress ring in intimate contact with the base despite the differences in expansion rates of the two metals. As the copper expands and contracts, the difference is taken up or compensated by the tendency of the spring member to follow the expansion of and contraction of the base metal.

The residual "spring back" maintains the seal between the cap and the base because of the pressure which is at all times exerted by the portions of the bent stress ring which are embedded in the base.

In addition to the spring back functions just described, the stress ring performs two other very important functions. It is a load carrying member and it also serves to increase the tightness of the seal. As a load carrying member it keeps the flowed material from pulling out of the recess when the structure is subjected to mechanical or thermal shock, vibration, tension, torsion, compression, or shear, and it is an important contributing factor to the high mechanical strength of these assemblies. The sealing functions are accomplished by the large number of sharp corners which are embedded into and grip the material of the stud base at many different angles. In this connection, it should be noted that where the cap is the softer or more plastic material, the base member should receive flowed material from the cap; and should provide the sharp corners which grip the material of the other component.

If desired additional corners or gripping points can be provided to implement the seal and strengthen the interlock. For example, as can be seen in FIGURE 12, the control flange 23 can be provided with an auxiliary sealing ring 231 which will bite into the face of the base on installation of the cap. To test the tightness of the seal, the housings were filled with argon at 90 p.s.i. and the pressurized assembly was alternately plunged into oil at 450° F. and alcohol at ambient temperatures. Assemblies having the labyrinth type sealing configuration illustrated in the FIGURE 1 embodiment, did not show or develop leakage when tested in this way.

Where the assembly is intended for use in connection with the housing of a solid state device, it is preferred to employ a sealing configuration which will include a surface within the housing which will not be deflected or buckled when the seal is effected. This is desirable because the assembly of the instrumentality requires the mounting of the dice or wafer in the base stud mount before joining the cap and base. Therefore, any buckling of the base immediately beneath the dice will tend to impair the electronic characteristics of the device or even break the crystal. Buckling or distortion of the plateau as little as 0.001" can seriously impair the properties of the device and interfere greatly with production efficiency.

One way for achieving this result can be seen in FIGURES 1 and 3. The inner diameter ($e$) of the base groove is significantly less than the diameter ($j$) of the cap. Therefore, there is a distinct gap 4 between the inner cap wall 201 and the inner groove wall 16. The tendency of the sealing pressures to transmit forces tending to distort the mounting plateau 15 will vary somewhat with the size of the gap 4 and also the depth ($f$) of the base groove 11. The wider the gap, the less will be the tendency for the plateau to buckle. Similarly the deeper the groove depth or the greater the difference in height between the plateau and the bottoming stop, the less will be the tendency for distortional forces to be transmitted through the base to cause buckling of the plateau.

FIGURE 4 illustrates a fully assembled semi-conductor namely a silicon recifier in which the sealing configuration employed is the same as that illustrated in FIGURES 1 to 3. The unit is assembled in more or less the same sequence of operations employed in the making of brazed or weld stud mounted housings. After machining the stud blank it is plated with a metal such as gold or silver which will mask the base during the subsequent etching operation. The wafer 30 is soldered on the plateau 15, the lead 31 and lead connector 32 are then secured to the wafer 30 by soldering and the assembly etched to develop the desired electrical characteristics. If desired, lacquer and latex coatings 33 can be applied to the wafer and the lead connector. The cap 20 and base are then sealed in the manner illustrated in FIGURE 2; however, in the FIGURE 4 embodiment the cap includes a conduit 34 through which contact with lead 31 can be established. Conduit 34 is insulated from the cap by a glass seal 35. The control flange 23 against which the sealing pressure is applied enables axial pressure to be applied to the cap without straining or stressing the glass seal to a point where it will break, crack or otherwise be impaired. After sealing the base and cap, the conduit 34 is crimped to form a good contact with the lead and then the end is flattened, contoured and sealed 36 to form a suitable connecting point.

Gaskets can, if desired, be used in connection with seals made according to this invention. For example, they can be positioned between the leading edge of the control ring and the face of the base (see 70 in FIGURE 12).

FIGURES 10 and 11 illustrate an alternative sealing configuration which are two annular outwardly opening recesses 24 and 24' which receive flowed metal from the base member wall. In this configuration, the intermediate flange 21' functions both as a stress ring and as a compression ring. Flanges 21, 21' and 22 have diameters which progressively increase in size with flange 21 being the smallest. Bottoming stops are provided for each of the cap rings or flanges (21 and 21'). These stops, 18 and 18', are spaced axially so that ring 21' will bottom on its stop 18' before ring 21 bottoms on its stop 18. FIGURE 11 shows the formed seal with the FIGURE 10 configuration.

The embodiment illustrated in FIGURES 5 and 6 is a very simple sealing configuration made in accordance with this invention and the tube wall 200 does not include a secondary recess for receiving flowed material from the base 100. This type of configuration will provide a mechanically strong interlock even though a labyrinth type seal is not effected. It should also be observed that the base 100 is not a stud type element.

FIGURE 7 illustrates sealing two tubular member 201 and 202. The material in part 202 has a lower yield point than that in part 201 (i.e., plastic flow will commence at a lower pressure). The recess to receive the flowed material is formed in the part having the higher yield point. In the FIGURE 7 embodiment the bottoming stop is not an integral part of element 202; the bottoming stop is anvil member 180 which can be withdrawn after the sealing operation has been completed. Axial pressure applied to parts 201 and 202 will cause cold flowing of material from part 202 into the recess 24 and this material, as in other embodiments of this invention will be gripped by the bent stress ring, and the stress ring in the assembled unit will be maintained in a state of elastic stress to impart the advantages of the residual spring action.

In FIGURES 8 and 9 a sealing configuration is illustrated in which some of the parts are given a somewhat different orientation than that shown in other views. In FIGURES 8 and 9 part 301 has a higher yield point than the material in part 302. The recess 240 is formed on an inner wall rather than on an external wall; the recess opens laterally but inwardly. To effect the seal as shown in FIGURE 9 the stress ring is caused to bend when it bottoms on the anvil 181. However, configuration of this type can also employ integral bottoming stops.

I claim:
1. A tube like part of circular cross section adapted for use as a component in the assembly of a housing for a solid state device or the like said tube having a plurality of circular circumferential flanges including a leading flange, a first following flange, and a second following flange axially spaced along the tube wall and integral therewith, said flanges having diameters greater than that of the outer tube wall, the leading flange being positioned at one end of the tube, a web portion connecting said tube with said leading flange, said web portion being thinner than the tube wall and extending angularly downwardly and outwardly from said tube wall, the leading flange having a smaller diameter than that of the first following flange, the first following flange having a smaller diameter than that of the second following flange, the adjacent faces of the leading and first following flanges together with the intermediate tube wall portions forming an annular outwardly opening primary recess leading to the tube wall and wherein the face of the first following flange which is presented toward the leading flange is provided with a secondary annular recess which branches off the primary recess.

2. In combination, a base member and a tube-like cap part adapted to be interlocked and form a seal, said base member having an opening adapted to concentrically receive a leading end portion of the tube-like part, said end portion including a stress ring integral with the tube wall and projecting downwardly and outwardly therefrom, said end portion further including a compression ring circumferentially disposed about the axis of the tube part, said compression ring having a diameter that is greater than the outside diameter of the opening in the base, said compression ring and said stress ring being spaced apart along the axis and separated by an annular outwardly opening recess in the tube wall, the root diameter of the recess being less than the outer diameters of the stress and compression rings; a bottoming stop positioned within the base opening, the axial distance from the leading edge of the stress ring to leading edge of the compression ring being less than the distance from the face of the base member to the bottoming stop, said base and tube part being interlocked, the compression ring being seated in the portion of the face of the base that surround the opening and material from the wall of the opening in the base member substantially filling the annular recess in the tube wall to seal the interlock, said seal being characterized in that an elastic stress is induced and maintained in the stress ring by its deflection towards the compression ring and by its radial expansion which causes the stress ring to be partially embedded in wall portions of the base opening.

3. A structure according to claim 2 wherein the cap part is made of material which, at the time of forming the interlock, is of lower plasticity than the base member material.

4. A structure according to claim 2 wherein the bottoming stop is an integral portion of the base member and forms the bottom of the opening in the base member.

5. A structure according to claim 2 wherein a second annular recess is formed in the face of the compression ring which is presented toward the base member, said second recess and said outwardly opening recess conjointly forming a labyrinth seal when substantially filled with material from the wall of the opening in the base member.

6. A structure according to claim 2 wherein the tube-like part is of circular cross section and the opening in the base member is circular.

7. A structure according to claim 2 wherein the tube like cap part is of lower plasticity than the base member and wherein the stress ring, the annular recess and the compression ring are formed in the base opening.

8. A structure according to claim 2 wherein the tube-like part includes a circumferential flange element adapted to control and limit the seating of the compression ring, said flange being positioned axially following the compression ring, said control flange having a greater diameter than that of the compression ring and the combined axial distance from the leading end of the stress ring to the leading edge of the control flange being greater than the distance from the face of the base member to the bottoming stop.

9. A structure according to claim 2 wherein the end of said tube-like cap part is of hollow circular cross section and is provided with a plurality of circumferential rings axially spaced along the tube wall and integral therewith, the diameters of the rings decreasing progressively from the outer-most ring to the innermost ring; said tube part further having a plurality of outwardly opening recesses, each recess being disposed circumferentially about the tube and positioned axially intermediate two adjacent circumferential rings, the root diameter of a given recess being less than the diameters of the rings positioned axially adjacent the recess; a plurality of bottoming stops positioned within the opening of the base member, each stop being positioned and adapted to engage one of the tube rings when the members are pressed into interlocking engagement, the axial distances between adjacent rings and adjacent bottoming stops being such that bottoming of the rings occurs sequentially, with the wider diameter rings bottoming on their respective stops before the next adjacent ring of smaller diameter engages and bottoms on its stop; and further characterized in that when the members are assembled into interlocking engagement an elastic stress is induced and maintained in at least one of the outermost rings by the deflection of the ring toward the next following ring when it engages its bottoming stop, and by the radial expansion of the ring to partially embed portions thereof in wall portions of the base member.

10. An interlocked structure according to claim 2 wherein the base is copper and the cap part is steel, said structure having a solid state device mounted on said base and surrounded by said cap part.

11. A structure according to claim 10, wherein the solid state device is a silicon rectifier mounted on a plateau in the face of the base member which is surrounded by the annular groove and separated from the cap by a gap.

12. The method of interlocking in sealing relationship a tube-like part having a circular cross-section to a base member which comprises: forming an opening in the base member, said opening being adapted to concentrically receive the tube; forming on said tube a pair of outwardly projecting circumferential circular flanges integral therewith and spaced apart on the axis of the tube so as to provide an annular recess between the two flanges, one of said flanges being a compression ring and another of said flanges being a stress ring; said compression ring having a diameter greater than the diameter of the opening in the base member; said stress ring having a diameter approximating but less than the diameter of the opening in the base member; positioning the tube within the opening in the base member with the stress ring in advance of the compression ring; providing stopping means within the opening in the base member which will engage the leading edge of the stress ring before the compression ring is fully seated in the face of the base member which surrounds the opening; applying pressure to the tube and base in a direction along the tube axis, said pressure being sufficient to install the compression ring in the face of the base member surrounding the opening and seal the base and cap by causing material from the wall of the base opening to be plastically flowed into the annular recess between the stress ring and the compression ring, by deflecting the stress ring so as to constrict the opening leading to the annular recess and grip the flowed material in the recess and by partially embedding portions of the stress ring in the wall of the base opening as the result of radial expansion of the stress ring thereby inducing and maintaining the deflected portions of the stress ring in a state of elastic stress.

13. The method according to claim 12 wherein the stress ring includes a web portion which projects downwardly and outwardly from the tube end and is thinner than the tube wall.

References Cited by the Examiner
UNITED STATES PATENTS

| | | | | |
|---|---|---|---|---|
| 2,522,408 | 9/50 | Sowter | | 29—470.1 |
| 2,707,889 | 5/55 | Sowter | | 29—470.1 |
| 2,820,929 | 1/58 | Coy | | 317—234 |
| 2,820,930 | 1/58 | Coy | | 317—234 |
| 2,975,928 | 3/61 | Roovers | | 29—470.1 X |
| 2,997,530 | 8/61 | Rosan | | 174—153 |
| 3,000,420 | 9/61 | Spokes. | | |
| 3,061,766 | 10/62 | Kelley | | 317—235 X |
| 3,079,970 | 3/63 | Barry. | | |

DARRELL L. CLAY, *Primary Examiner.*

SAMUEL BERNSTEIN, JOHN P. WILDMAN, E. JAMES SAX, *Examiners.*